No. 876,609. PATENTED JAN. 14, 1908.
H. L. TURNEY.
CLUTCH OPERATING MECHANISM.
APPLICATION FILED AUG. 5, 1907.

2 SHEETS—SHEET 2.

Witnesses

Inventor
Harry L. Turney,
By C. A. Snow & Co.
Attorneys

UNITED STATES PATENT OFFICE.

HARRY LEON TURNEY, OF PORTLAND, OREGON.

CLUTCH-OPERATING MECHANISM.

No. 876,609.    Specification of Letters Patent.    Patented Jan. 14, 1908.

Application filed August 5, 1907. Serial No. 387,160.

*To all whom it may concern:*

Be it known that I, HARRY LEON TURNEY, a citizen of the United States, residing at Portland, in the county of Multnomah and State of Oregon, have invented a new and useful Clutch-Operating Mechanism, of which the following is a specification.

This invention relates to clutch operating mechanisms, and more particularly to devices employed for applying and releasing the clutches of logging and hoisting engines.

One of the principal objects of the invention is to provide a novel form of clutch operating mechanism in which steam or other actuating fluid is employed to move the clutch to locking and release positions.

A further object of the invention is to provide a device of this character in which the parts are so arranged that the clutch will remain locked when once applied, thus avoiding the necessity of maintaining the fluid pressure which moves the clutch to the operating position.

A still further object of the invention is to improve, simplify and cheapen the construction of clutch operating devices of this type.

With these and other objects in view, as will more fully hereinafter appear, the invention consists in certain novel features of construction and arrangement of parts, hereinafter fully described, illustrated in the accompanying drawings, and particularly pointed out in the appended claims, is being understood that various changes in the form, proportions, size and minor details of the structure may be made without departing from the spirit or sacrificing any of the advantages of the invention.

Figure 1:
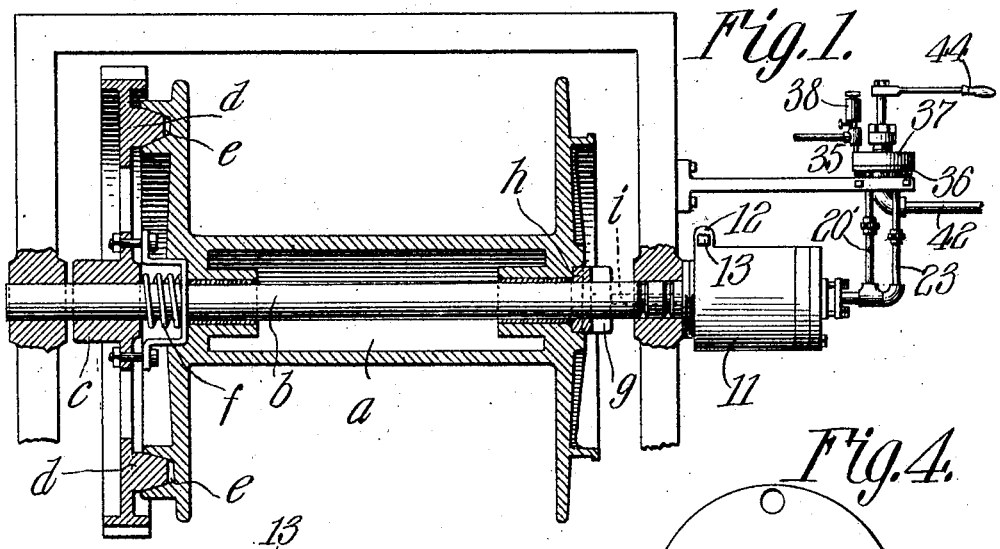
Figure 2:
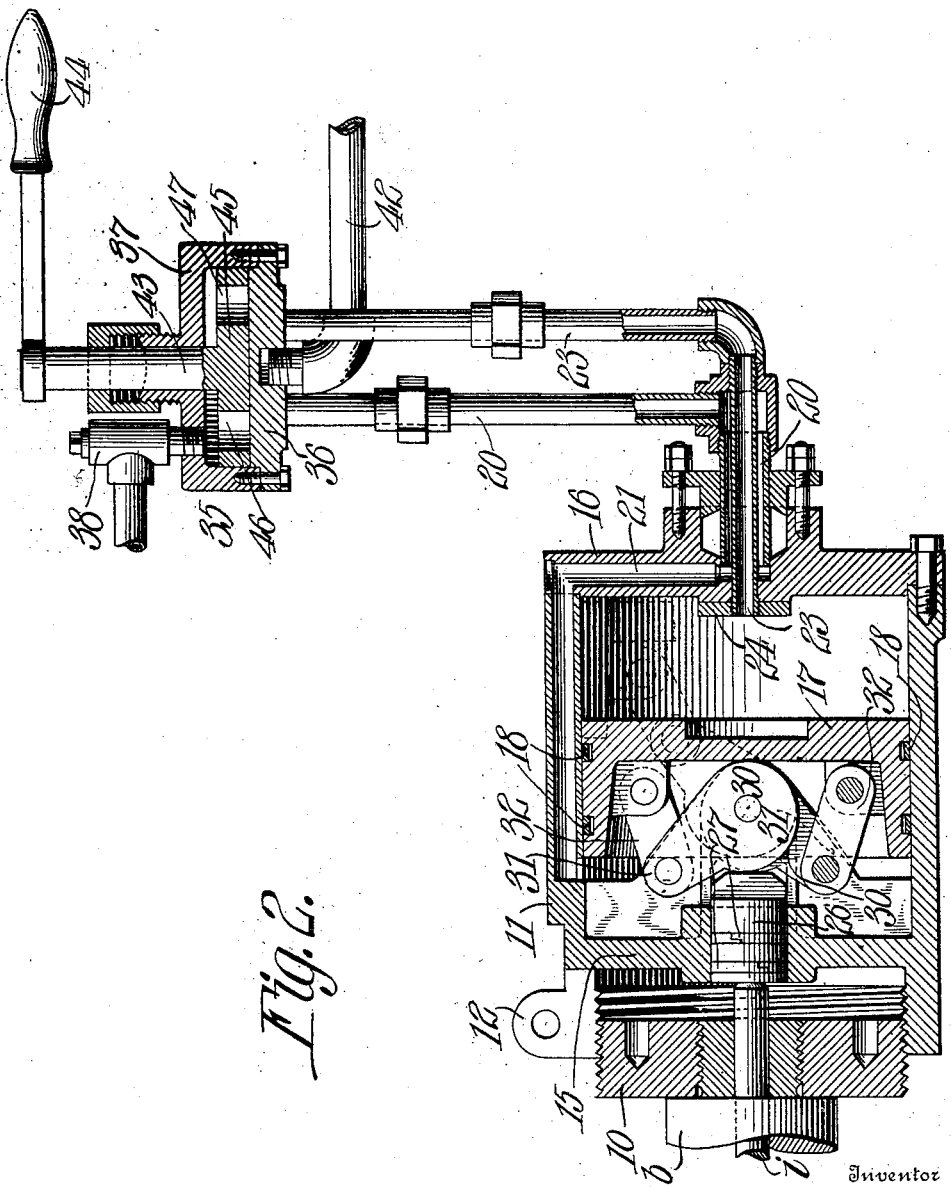

In the accompanying drawings:—Figure 1 is a sectional plan view of a clutch operating mechanism constructed in accordance with the invention. Fig. 2 is a transverse sectional view of the clutch operating mechanism drawn to an enlarged scale. Fig. 3 is a transverse sectional view through the cylinder and piston. Fig. 4 is a detail plan view of the valve seat. Fig. 5 is a similar view of the valve. Fig. 6 is a transverse sectional view of the valve seat showing the arrangement of the exhaust port.

Similar numerals of reference are employed to indicate corresponding parts throughout the several figures of the drawings.

The clutch operating mechanism is intended more especially for use in connection with logging or hoisting engines, wherein a winding drum $a$ is loosely mounted on a shaft $b$ to which is keyed or otherwise secured a driving gear $c$. The gear carries an annular friction ring $d$ which is arranged to engage the tapered walls of an annular groove $e$ formed at one end of the drum, and the drum and gear are normally separated by means of a compression spring $f$. One end of the shaft is provided with a diametrically disposed slot through which extends a cross key $g$ that is arranged to operate against a collar $h$, the collar bearing against one end of the winding drum $a$. This cross key is engaged by a thrust pin $i$ and when the latter is moved in the direction of the key, the key presses against the collar $h$ and the latter shifts the winding drum longitudinally of the shaft until the drum is clutched to the gear wheel, so that rotative movement will then be imparted from the gear wheel to the winding drum. When endwise pressure on this thrust pin $i$ is relieved, the spring $f$ separates the drum from the gear wheel to permit unwinding.

The present invention relates to means for actuating the thrust pin $i$. One end of the shaft $b$ is threaded and carries a nut 10 having a threaded periphery on which is screwed the split tubular end of a cylinder 11, and at the split portion of the cylinder are lugs 12 having openings for the passage of a clamping bolt 13, which may be provided for the purpose of firmly locking the cylinder in position on the nut. The cylinder is provided with an inner head 15 and an outer head 16, and in said cylinder is arranged a piston 17 having a suitable packing ring 18.

Extending through a stuffing box in the outer head of the cylinder is a fluid pressure pipe 20 which communicates with a port 21 that leads through the outer head and the wall of the cylinder to the inner end of said cylinder, this port serving for the admission of steam or other fluid to force the piston outward or to clutch releasing position. Within the steam supply pipe 20 is arranged a second steam supply pipe 23 that communicates with the outer portion of the cylinder and is held in place by a suitable nut 24 fitting against the inner wall of the cylinder head and screwing on to the inner end of the pipe.

The inner head 15 of the cylinder is bored to form a small cylinder for the reception of a plunger or thrust block 26 having suitable packing rings 27, and these thrust blocks engage against the end of the thrust pin 7.

Extending across the inner portion of the cylinder, and preferably formed integral therewith, are two spaced bridge pieces 28 having openings for the reception of a transversely disposed pin 29 on which are mounted two locking eccentrics or cams 30, said cams having arms 31 which are connected by links 32 to lugs on the inner face of the main piston, and when the piston is moved inward to the position shown in full lines in Fig. 2, the cams will be rocked until their highest points are in alinement with the longitudinal axis of the thrust pin and block, or slightly beyond such axis, so that the cams are self locking and will remain in clutch operating position without the necessity of maintaining constant pressure of steam or other fluid on the piston after the latter has been moved to clutch engaging position.

When steam is admitted to the inner end of the cylinder, the piston is forced outward to the dotted line position shown in Fig. 2, thereby removing the locking cams from the thrust block, so that the thrust pin is free to move under the influence of the compression spring f to allow the release of the clutch.

At any convenient point is arranged a valve chamber 35 including a ported base 36 and a cap or bonnet 37; the latter being placed in communication with a source of pressure supply through a pipe 38. The base 36 has two steam ports 39 and 40 which communicate with the pipes 20 and 23, respectively, and is further provided with an exhaust port 41 that communicates with a discharge pipe 42. The cap or bonnet has a stuffing box for the passage of a valve stem 43 at the outer end of which is a suitable operating handle 44. At the inner end of the stem 43 is arranged a disk valve 45 having two steam ports 46—47 and an exhaust port 48. This valve may be turned so that steam will flow through the port 46 and port 39 to pipe 20, and thence to the inner end of the cylinder for the purpose of releasing the clutch, while at the same time the exhaust may pass from the outer end of the cylinder through the pipe 23, ports 40 and 48, to the exhaust. On movement in the other direction, the steam is allowed to flow through the pipe 23 to the outer end of the cylinder for the purpose of applying the clutch and to exhaust from the inner end of the cylinder.

I claim:—

1. In clutch operating mechanism, a revoluble shaft, a cylinder secured thereto, a thrust block extending through one end of the cylinder, a pair of pivotally mounted cam levers arranged in the cylinder and engaging the thrust block, and a piston disposed in the cylinder and operatively connected to said cam levers, said levers being arranged to automatically lock when the clutch has been moved to engaging position.

2. In clutch operating mechanism, a revoluble shaft, a cylinder secured thereto and having inner and outer heads, the inner head being centrally bored, a thrust block extending through the inner head, a clutch operating thrust pin engaged by said block, a piston in the cylinder, a pivotally mounted self locking cam lever arranged to engage the thrust block, and a connecting means between the cam lever and the piston.

3. In clutch operating mechanism, a revoluble shaft, a cylinder secured thereto and provided with inner and outer heads, means for controlling the admission and exhaust of an operating fluid, the inner head of the cylinder being centrally bored, a thrust block extending through the inner head of the cylinder, a clutch operating thrust pin with which the block engages, a pivotally mounted cam disposed in the cylinder and engaging the thrust block, said cam having an extended arm and arranged in one position to automatically lock and hold the thrust pin in clutch engaging position, a piston in said cylinder, and a link connecting said piston to the cam.

4. In clutch operating mechanism, a revoluble shaft, a cylinder mounted thereon and having inner and outer heads, the inner head being centrally bored, a cylindrical thrust block extending through the inner head of the cylinder and provided with a packing ring, an endwise movable thrust pin with which the block engages, a piston arranged in the cylinder, a pair of oppositely disposed cam levers pivoted within the cylinder and arranged to engage the thrust block, and links connecting said cam levers to the piston.

5. In clutch operating mechanism, a revoluble shaft having a threaded end, a nut mounted on the threaded end of the shaft and having a threaded periphery, a cylinder having an extended portion screwed on the nut, the inner head of said cylinder having a central bore, a cylindrical thrust block mounted in the bored portion of the head, an endwise movable thrust pin engaged by the block, a pivot pin supported within the cylinder, a pair of eccentric cam levers mounted on the pin and engaging against the inner end of said thrust block, a piston in the cylinder, and links connecting the cam levers to said piston.

6. In clutch operating mechanism, a revoluble shaft, a cylinder mounted thereon, a piston in the cylinder, a thrust pin, means for transmitting movement from the piston to the thrust pin, a stuffing box arranged at the rear head of the cylinder, a steam pipe passing therethrough, a port extending through the end wall of the cylinder and with which the steam pipe connects, a second steam pipe fitting within the first and extending through to the interior of the cylinder, a valve casing with which both pipes communicate, and
5 a ported valve disposed in such casing and controlling the flow of a fluid under pressure to and from the cylinder.

In testimony that I claim the foregoing as my own, I have hereto affixed my signature in the presence of two witnesses.

HARRY LEON TURNEY.

Witnesses:
M. R. PARELIUS,
F. L. JENNINGS.